US009444518B2

(12) United States Patent
Ohren et al.

(10) Patent No.: US 9,444,518 B2
(45) Date of Patent: Sep. 13, 2016

(54) ONE TOUCH PRODUCT INFORMATION ON MOBILE COMMUNICATION DEVICE USING NEAR FIELD COMMUNICATION

(71) Applicant: Sony Corporation, Tokyo (JP)

(72) Inventors: Christopher Mark Ohren, San Diego, CA (US); Charles Donald Hedrick, Jr., Escondido, CA (US); Herbert Sleeper, San Diego, CA (US); Sarvesh Chinnappa, Carlsbad, CA (US); Samuel David Rosewall, Jr., Carlsbad, CA (US); Jason Leigh Transfiguracion, Poway, CA (US)

(73) Assignee: Sony Corporation, Tokyo (JP)

( * ) Notice: Subject to any disclaimer, the term of this patent is extended or adjusted under 35 U.S.C. 154(b) by 37 days.

(21) Appl. No.: 14/332,708

(22) Filed: Jul. 16, 2014

(65) Prior Publication Data

US 2015/0222329 A1 Aug. 6, 2015

Related U.S. Application Data

(60) Provisional application No. 61/934,211, filed on Jan. 31, 2014.

(51) Int. Cl.
*H04W 4/00* (2009.01)
*H04B 5/00* (2006.01)
*G06Q 30/00* (2012.01)

(52) U.S. Cl.
CPC .......... *H04B 5/0031* (2013.01); *G06Q 30/016* (2013.01); *H04W 4/008* (2013.01)

(58) Field of Classification Search
CPC .. G06Q 30/016; H04B 5/0031; H04W 4/008
See application file for complete search history.

(56) References Cited

U.S. PATENT DOCUMENTS

| 7,956,749 | B2 | 6/2011 | Hartwig et al. | |
| 8,091,780 | B2 | 1/2012 | Todd et al. | |
| 8,351,854 | B2 | 1/2013 | Moosavi | |
| 8,615,195 | B2 | 12/2013 | Moosavi | |
| 8,627,364 | B2 | 1/2014 | Song et al. | |
| 2009/0282130 | A1 | 11/2009 | Antoniou et al. | |
| 2009/0285483 | A1* | 11/2009 | Guven | G06Q 30/016 382/181 |
| 2010/0063893 | A1* | 3/2010 | Townsend | G06Q 20/12 705/26.1 |
| 2010/0174599 | A1* | 7/2010 | Rosenblatt | G06Q 30/02 705/14.37 |
| 2010/0277435 | A1 | 11/2010 | Han et al. | |
| 2012/0150748 | A1* | 6/2012 | Law | G06Q 20/20 705/71 |
| 2012/0150750 | A1* | 6/2012 | Law | G06Q 20/20 705/76 |
| 2012/0171952 | A1* | 7/2012 | Ohira | H04M 1/72525 455/41.1 |
| 2012/0265694 | A1 | 10/2012 | Tuchman et al. | |
| 2012/0265696 | A1* | 10/2012 | Tuchman | G06Q 30/016 705/304 |
| 2012/0276977 | A1 | 11/2012 | Leczek et al. | |
| 2013/0096906 | A1 | 4/2013 | Niemeyer et al. | |
| 2013/0109311 | A1 | 5/2013 | Moosavi | |
| 2013/0130777 | A1 | 5/2013 | Lemay et al. | |
| 2013/0194993 | A1 | 8/2013 | Choi | |

(Continued)

*Primary Examiner* — David Bilodeau
(74) *Attorney, Agent, or Firm* — John L. Rogitz

(57) ABSTRACT

A one-touch application is launched by a user of a mobile communication device (MCD) selecting a single selector element on the MCD, and in response the MCD automatically and without further user interaction establishes near field communication (NFC) with an electronic product, receives identifying data from the electronic product over NFC, and uploads the identifying data wirelessly to a cloud server associated with a manufacturer of the electronic product. The server sends back to the MCD and/or to the electronic product information about the electronic product.

20 Claims, 4 Drawing Sheets

(56) References Cited

U.S. PATENT DOCUMENTS

| | | |
|---|---|---|
| 2013/0196595 A1 | 8/2013 | Byrne et al. |
| 2013/0203489 A1 | 8/2013 | Lyons |
| 2013/0211900 A1 | 8/2013 | Dessert |
| 2013/0218682 A1 | 8/2013 | Alterman et al. |
| 2013/0226720 A1 | 8/2013 | Ahluwalia et al. |
| 2013/0238456 A1 | 9/2013 | Soysa et al. |
| 2013/0268858 A1 | 10/2013 | Kim et al. |
| 2013/0297281 A1 | 11/2013 | Niemeyer et al. |
| 2013/0304795 A1 | 11/2013 | Kang et al. |
| 2014/0025747 A1 | 1/2014 | Sarkar et al. |
| 2014/0033050 A1 | 1/2014 | Shin et al. |
| 2014/0106718 A1* | 4/2014 | Liu ............ H04W 64/00 455/414.1 |
| 2014/0113548 A1* | 4/2014 | Camulli ......... H04M 3/5238 455/41.1 |
| 2014/0179222 A1* | 6/2014 | Chaudhary ....... H04B 5/0031 455/41.1 |
| 2015/0099494 A1* | 4/2015 | Liu ............ G06Q 30/01 455/414.1 |

* cited by examiner

| Problem | Solution | URL | Key | Payload | Action |
|---|---|---|---|---|---|
| DSC-QX10 Generic | View the online user guide | http://pdf.crse.com/manuals/4477311121/EN/index.html | DSC-QX10 | ???????DIRECT-uNQ0:DSC-QX10??RddVU5NU | ✏ ▭ |
| DSC-QX100 Generic | View the online user guide | http://pdf.crse.com/manuals/4477311121/EN/index.html | DSC-QX100 | ???????DIRECT-uNQ0:DSC-QX100??RddVU5NU | ✏ ▭ |
| | View the online troubleshooting info | http://www.sonymobile.com/global-en/support/accessories/wireless-speaker-srs/bty5/ | dkfrjk333jff | dkfrjk333jff | ✏ ▭ |
| Your SRS-BTV5 speaker has not been connected to a device yet. | Search the Sony support forums for help | http://talk.sonymobile.com/t5/forums/searchpage/tab/message?filter=labels%2Clocation&location=forum-board%3Aaccessories&q=srs-bty5 | dkkdk | ??????? | ✏ ▭ |
| | Watch tutorial video | http://www.youtube.com/watch?v=i0-Qpog-2L0 | 016520de | 29000cb016520de 8c09095352532d4254 56350440d1404241103081110b110c1 10d110e111e11311110012 | ✏ ▭ |

*FIG. 6*

ONE TOUCH PRODUCT INFORMATION ON MOBILE COMMUNICATION DEVICE USING NEAR FIELD COMMUNICATION

FIELD OF THE INVENTION

The application relates generally to obtaining information about a product using near field communication (NFC) between the product and a mobile communication device.

BACKGROUND OF THE INVENTION

A computer ecosystem, or digital ecosystem, is an adaptive and distributed socio-technical system that is characterized by its sustainability, self-organization, and scalability. Inspired by environmental ecosystems, which consist of biotic and abiotic components that interact through nutrient cycles and energy flows, complete computer ecosystems consist of hardware, software, and services that in some cases may be provided by one company, such as Sony. The goal of each computer ecosystem is to provide consumers with everything that may be desired, at least in part services and/or software that may be exchanged via the Internet. Moreover, interconnectedness and sharing among elements of an ecosystem, such as applications within a computing cloud, provides consumers with increased capability to organize and access data and presents itself as the future characteristic of efficient integrative ecosystems.

Two general types of computer ecosystems exist: vertical and horizontal computer ecosystems. In the vertical approach, virtually all aspects of the ecosystem are owned and controlled by one company, and are specifically designed to seamlessly interact with one another. Horizontal ecosystems, one the other hand, integrate aspects such as hardware and software that are created by other entities into one unified ecosystem. The horizontal approach allows for greater variety of input from consumers and manufactures, increasing the capacity for novel innovations and adaptations to changing demands.

SUMMARY OF THE INVENTION

Present principles are directed to easily allowing a user of a product in an ecosystem to obtain information on that product easily through a mobile communication device that is also part of the ecosystem simply by moving the mobile communication device into close proximity to the product. As understood herein, this is desirable because current on-line help solutions tend to be over-inclusive of information that does not separate useful information from clutter, may be provided in languages or dialects for regions other than that of the user, etc. Furthermore, present principles understand that close proximity communication (referred to herein as "near field communication" or "NFC") communication protocols typically are designed for limited functionality, do not have a standard data structure for carrying data payload between disparate products, and do not support sufficient data transfer for activities such as registering products.

Accordingly, a mobile communication device (MCD) includes at least one computer readable storage medium bearing instructions executable by a processor, and at least one processor configured for accessing the computer readable storage medium to execute the instructions to configure the processor for establishing a wireless near field communication (NFC) link with an electronic product. The instructions when executed by the processor configure the processor for receiving at least identifying data of the product over the link, sending the identifying data of the product to a network server, and in response to sending the identifying data of the product to a network server, obtaining from a network server information about the product.

In example embodiments the instructions when executed by the processor configure the processor for invoking an information application responsive to a single user selection of a selector element to invoke the information application. Also, the instructions when executed by the processor may configure the processor for automatically and without further user interaction execute the information application to undertake the establishing, receiving, sending, and obtaining acts.

In non-limiting implementations the receiving, sending, and obtaining acts are executed using wireless communication. At least one of the receiving, sending, and obtaining acts may be executed using wireless communication. In examples, the MCD and the product both use a predetermined communication protocol to communicate over NFC, with the predetermined protocol at least in part defining data fields in which the identifying data is contained. The identifying data may include one or more of product serial number, product model number, firmware version of the product. The information about the product may include one or more of product registration confirmation, recall information related to the product, operating instructions pertaining to the product and/or at least one user manual and/or at least one support form by which a user can request technical support for the product and/or an application sent from the server to the MCD and executed by the MCD to alter at least one configuration parameter of the MCD and/or a network address and/or hyperlink selectable by a user to establish communication with a network site providing a user guide for the product.

In some examples, the receiving at least identifying data of the product over the link is precipitated by a user of the MCD physically touching, once and only once, the MCD to the product as sensed by at least one sensor in the MCD and/or product. If desired, the instructions when executed by the processor can configure the processor for sending the identifying data of the product only to a server associated with a manufacturer of the product. The information about the product may be sent from the MCD to the product for display thereof on the product. The information about the product may be sent from the server to the product without passing through the MCD. In non-limiting examples, the information about the product includes an application sent from the server to the MCD and executed by the MCD to communicate with the product to cause the product to alter at least one configuration parameter of the product.

In another aspect, a method includes establishing near field communication (NFC) between a mobile communication device (MCD) and an electronic product, and then, automatically and without further user interaction, using NFC to receive identifying data of the product at the MCD. The method further includes wirelessly uploading the identifying data of the product to an Internet server and receiving from an Internet server information about the product.

In another aspect, a system includes a mobile communication device (MCD) and an electronic product configured for communicating with the MCD using near field communication (NFC). The MCD is programmed with instructions to receive identifying data from the electronic product using NFC and upload the data automatically without user interaction to a server associated with a manufacturer of the electronic product to receive back information about the product.

The details of the present application, both as to its structure and operation, can be best understood in reference to the accompanying drawings, in which like reference numerals refer to like parts, and in which:

BRIEF DESCRIPTION OF THE DRAWINGS

FIG. 6 is an example table showing correlations between problems and solutions and various messaging parameters appertaining thereto.

DETAILED DESCRIPTION

Figure 1:
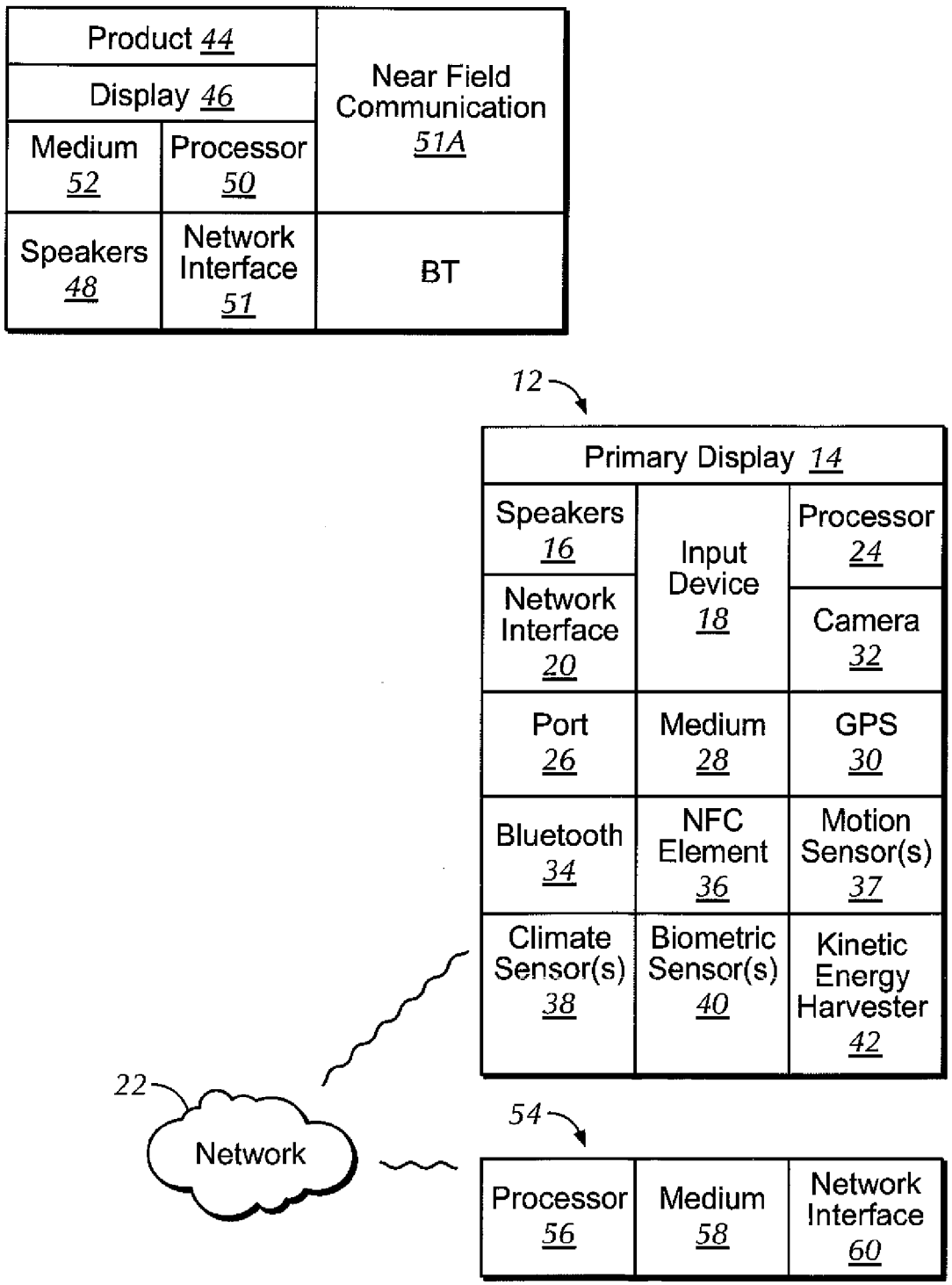
FIG. 1 is a block diagram of an example system including an example in accordance with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example mobile communication device (MCD) 12 that may be waterproof (e.g., for use while swimming). The MCD 12 may be, e.g., a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc., and even e.g. a computerized Internet-enabled television (TV). Regardless, it is to be understood that the MCD 12 is configured to undertake present principles (e.g. communicate with other CE devices to undertake present principles, execute the logic described herein, and perform any other functions and/or operations described herein).

Accordingly, to undertake such principles the MCD 12 can be established by some or all of the components shown in FIG. 1. For example, the MCD 12 can include one or more touch-enabled displays 14, one or more speakers 16 for outputting audio in accordance with present principles, and at least one additional input device 18 such as e.g. an audio receiver/microphone for e.g. entering audible commands to the MCD 12 to control the MCD 12. The example MCD 12 may also include one or more network interfaces 20 for communication over at least one network 22 such as the Internet, an WAN, an LAN, etc. under control of one or more processors 24. It is to be understood that the processor 24 controls the MCD 12 to undertake present principles, including the other elements of the MCD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, WiFi transceiver, etc.

In addition to the foregoing, the MCD 12 may also include one or more input ports 26 such as, e.g., a USB port to physically connect (e.g. using a wired connection) to another CE device and/or a headphone port to connect headphones to the MCD 12 for presentation of audio from the MCD 12 to a user through the headphones. The MCD 12 may further include one or more tangible computer readable storage medium 28 such as disk-based or solid state storage, it being understood that the computer readable storage medium 28 may not be a carrier wave. Also in some embodiments, the MCD 12 can include a position or location receiver such as but not limited to a GPS receiver and/or altimeter 30 that is configured to e.g. receive geographic position information from at least one satellite and provide the information to the processor 24 and/or determine an altitude at which the MCD 12 is disposed in conjunction with the processor 24. However, it is to be understood that that another suitable position receiver other than a GPS receiver and/or altimeter may be used in accordance with present principles to e.g. determine the location of the MCD 12 in e.g. all three dimensions.

Continuing the description of the MCD 12, in some embodiments the MCD 12 may include one or more cameras 32 that may be, e.g., a thermal imaging camera, a digital camera such as a webcam, and/or a camera integrated into the MCD 12 and controllable by the processor 24 to gather pictures/images and/or video in accordance with present principles. Also included on the MCD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the MCD 12 may include one or more motion sensors 37 (e.g., an accelerometer, gyroscope, cyclometer, magnetic sensor, infrared (IR) motion sensors such as passive IR sensors, an optical sensor, a speed and/or cadence sensor, a gesture sensor (e.g. for sensing gesture command), etc.) providing input to the processor 24. The MCD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that in some embodiments the MCD 12 may also include a kinetic energy harvester 42 to e.g. charge a battery (not shown) powering the MCD 12.

Still referring to FIG. 1, in addition to the MCD 12, the system 10 may include one or more other CE device types such as, but not limited to, a product 44 which may be any CE device or other electronic product about which a user may wish to obtain information. In the example shown, the product 44 is an audio video display device (AVDD) such as a TV, and accordingly has a suitable video display 46 and one or more audio speakers 48 controlled by one or more processors 50 accessing one or more computer readable storage media 52. The processor 50 may communicate with other devices and systems using one or more interfaces such as a computer network interface 51, such as a modem, a Bluetooth or other NFC interface 51A, satellite/cable/terrestrial receiver interfaces, etc.

Now in reference to the afore-mentioned at least one server 54, it includes at least one processor 56, at least one tangible computer readable storage medium 58 that may not be a carrier wave such as disk-based or solid state storage, and at least one network interface 60 that, under control of the processor 56, allows for communication with the other CE devices of FIG. 1 over the network 22, and indeed may facilitate communication between servers and client devices in accordance with present principles. Note that the network interface 60 may be, e.g., a wired or wireless modem or router, WiFi transceiver, or other appropriate interface such as, e.g., a wireless telephony transceiver.

Accordingly, in some embodiments the server 54 may be an Internet server, may include and perform "cloud" functions such that the CE devices of the system 10 may access a "cloud" environment via the server 54 in example embodiments.

Figure 2:
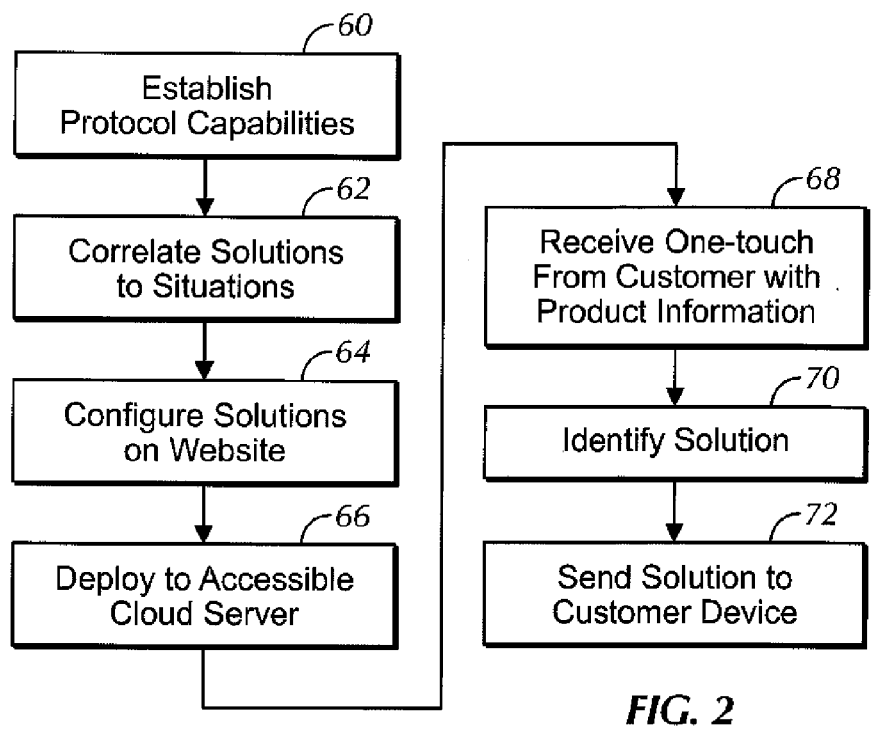
FIG. 2 is a flow chart of example set up logic.

Referring now to FIG. 2, at block 60 engineers establish the NFC protocol capabilities examples of which are discussed further below. At block 62 solutions are generated and correlated to respective situations (problems), and then at block 64 these solutions are reduced to a data structure such as the one shown in FIG. 6 and described further below to correlate them with their respective situations. This may be done initially on an internal web server and then at block 66 deployed to a cloud server that is accessible to user devices executing, e.g., a computer application according to principles below.

As described in greater detail, a signal can be received from a user or customer computer at block 68 pursuant to the user executing a single touch of his computer against a product to obtain, via NFC, identifying information of the product. Using the signal and information therein a solution is identified typically at the cloud server at block 70 and downloaded to the user device at block 72.

The product-identifying information obtained by the user computer using NFC and uploaded to the cloud server can include or more of product serial number, product model number, and firmware version of the product. The information returned in response by the server about the product may include one or more of product registration confirmation, recall information related to the product, operating instructions pertaining to the product and/or at least one user manual and/or at least one support form by which a user can request technical support for the product and/or an application sent from the server to the MCD and executed by the MCD to alter at least one configuration parameter of the MCD and/or a network address and/or hyperlink selectable by a user to establish communication with a network site providing a user guide for the product.

Thus, some solutions may be informational (for instance, viewing a website, watching a video, etc.) while other solutions may involve the app interfacing from the user computer directly to the target product device (for instance, applying a software patch, changing a setting, giving a command, etc.)

As discussed above, an internal website can serve as a tool allowing customer support teams to associate solutions with data from devices. Note that a limited number of operators can be used to construct logical statements for matching conditions with solutions. For example:

```
"model" == "dsc-qx10"
"free_space" < "10%"
"battery_life" < "20%" && "plugged_in" == "false"
```

Figure 3:
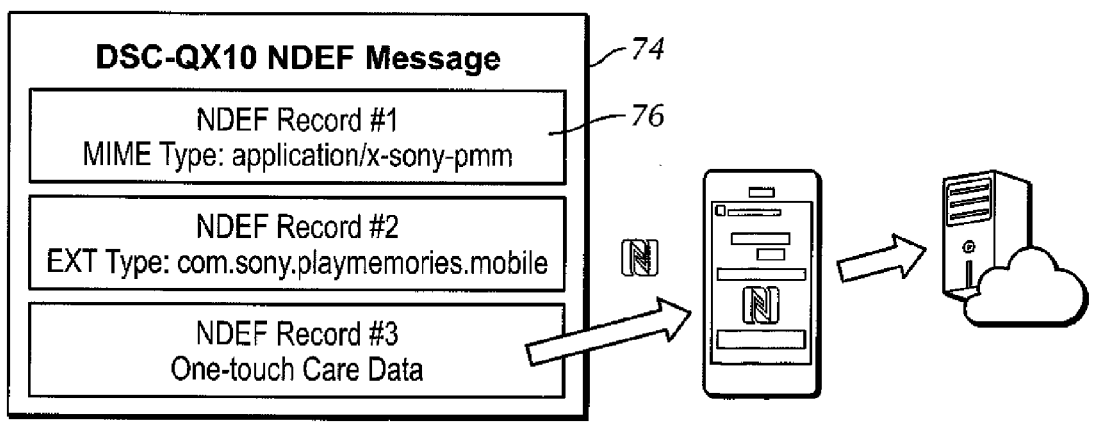
FIG. 3 is a schematic diagram of an example near field communication (NFC) message.

Variables can be defined which allow substituting values from the device data into the solution automatically, e.g., from device data: "model":"dsc-qx10"; solution pattern: "url": https://support.sony.com/manual/$model In reference to FIG. 3 an example NFC message that may be sent from a product to a user computer pursuant to one-touch operation described above can include plural records 76. The records may include a multipurpose Internet mail extension (MIME) type identifying the serial number of application of the product, an EXT type record, and a record identifying the version of the application used to execute the one-touch feature. The record types may include external (Type 4). The payload format may be Javascript Object Notation (JSON) and the payload may be encrypted for security if the source device has the capability. As discussed above, the payload content may include the One-touch application version, the product model name/number, and a unique product serial number. Optional data may include any key attribute-value pairs. The source device (product) can populate data relevant to its state/condition, e.g., can indicate whether it is experiencing errors, can indicate setting values, status, etc. In this way, a product may produce diagnostic data (e.g. "error codes") and encapsulate those codes in the NFC message. Or, products may encapsulate in the NFC message sent to the user computer pursuant to the one touch operation setting values, log files, etc.).

As an example, a product that is a type QX10 camera made by Sony may generate the below message that can be received by a user computer via NFC:

```
<NdefMessages>
    <NdefMessage>
        <NdefRecord>
            <Type value="6170706c69636174696f6e2f782d736f6e792d706d6d" tnf="02">
                MIME: application/x-sony-pmm
            </Type>
            <Payload value="0001000110132d5158313030100100085264645655354e55">
                <String></String>
            </Payload>
        </NdefRecord>
        <NdefRecord>
            <Type Value="616e64726f69642e636f6d3a706b67" tnf="04">
                EXTERNAL: urn:nfc:ext:android.com:pkg
            </Type>
            <Payload value="6366f6e792e706c61796d656d6f726965732e6d6f62696c65">
                <String>com.sony.playmemories.mobile</String>
            </Payload>
        </NdefRecord>
        <NdefRecord>
            <Type value="e64e6f6d6163a726f69642706b67" tnf="05">
                MIME: application/x-sony-otc
            </Type>
            <Payload value="7367061796d656d6ff6e792e72e61796d6f6269269657696c65">
                <String>com.sony.otc</String>
            </Payload>
        </NdefRecord>
    </NdefMessage>
</NdefMessages>
```

The decoded payload from the above is:

```
{
    "otc_version":"1.0",
    "model":"DSC-QX10",
    "serial":"A13579",
    "data"
    {
        "fw_version":"1.1",
        "battery_level":"40%",
        "memory_used":"95%",
        "error_codes":["100","704"]
    }
}
```

Figure 4:
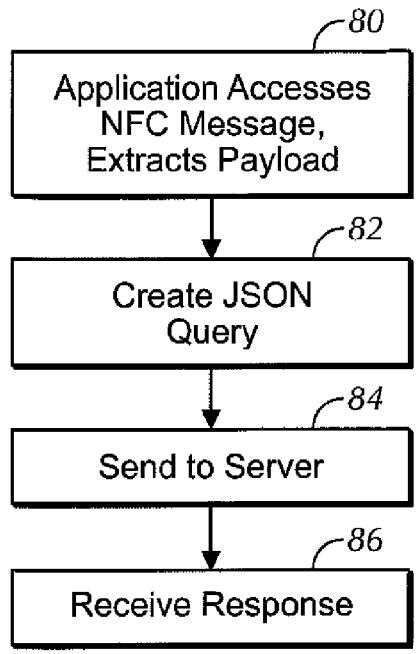
FIG. 4 is a flow chart of example one-touch logic.

With respect to FIG. 4, at block 80 the user computer is moved into proximity to a product as by touching the user computer once to the product to receive from the product an NFC message. In doing so the user computer typically executes an application, referred to herein as a "one touch" or "OTC" application. The payload is extracted from the message by the user computer and reformatted into a server query in, e.g., BON at block 82. The query can include user computer data (e.g., a type of smart phone), and product data (e.g., a type of camera such as a QX10 camera). At block 84 the OTC application causes the user computer to communicate the query to a network or cloud server whose network address is encoded into the OTC application. The response from the server containing information describing solutions is received at block 86.

An example query may be:

```
{
    "otc_version":"1.0",
    "client"
    {
        "model":"C6906",
        "android":"4.3",
        "otc_app":"1.0",
        "network":"4G/LTE",
        "bluetooth":"on"
    }
    "device"
    {
        "model":"DSC-QX10",
        "serial":"A13579",
        "data"
        {
            "fw_version":"1.1",
            "battery_level":"40%",
            "memory_used":"95%",
            "error_codes":["100","704"]
        }
    }
}
```

In the above example the user computer information is first, then the product information (labeled "device"), then various statuses of the product as received in the NFC payload, including its firmware version, its battery level, its memory used, and any error codes.

To reiterate and expand on the type of product information or solutions that may be returned from the server, solutions may encompass any resource, process, tool, etc. which can answer a question, resolve an issue, fulfill a need, and provide an opportunity desirable to the customer. This paradigm supports customers by re-using all of the resources in which they have already invested, and by permitting the design of new/creative/progress solutions which weren't possible prior to present principles. Solutions may be executed by the user computer executing the OTC application, such as showing a website or playing a video. Some solutions, relayed by the user computer to the product, may be executed by the product to, e.g., change a setting of the product, applying new firmware to the product.

Additionally, if desired the server may perform a search based on the client (user computer) and target device (product) information contained in the query to identify one or more appropriate solutions to be returned as part of a query response. There are three main classes of solutions which can be included in the query response, including those executed completely on the client device (e.g., display a website), those in which the client (user computer) remotely controls the target device (product) through an exposed interface (e.g. webapi), and those in which the user computer passes solution information directly to the product for execution by the product as described above.

Following are examples of the above.

Solution for Showing the QX10 Camera Online User Guide:

When the QX10 camera is touched using a user computer such as a smart phone executing the One-touch Care app, the solution returned from the server contains the url of the user guide to present on the user computer. The user guide opens automatically on the user computer after touching, and no other steps necessary. An example server query response is:

```
{
    "otc_version":"1.0",
    "device"
    {
        "model":"DSC-QX10",
        "serial":"A13579"
    }
    "solution"
    {
        "website":"http://www.sony.com/manual/dscqx10"
    }
}
```

Figure 5:
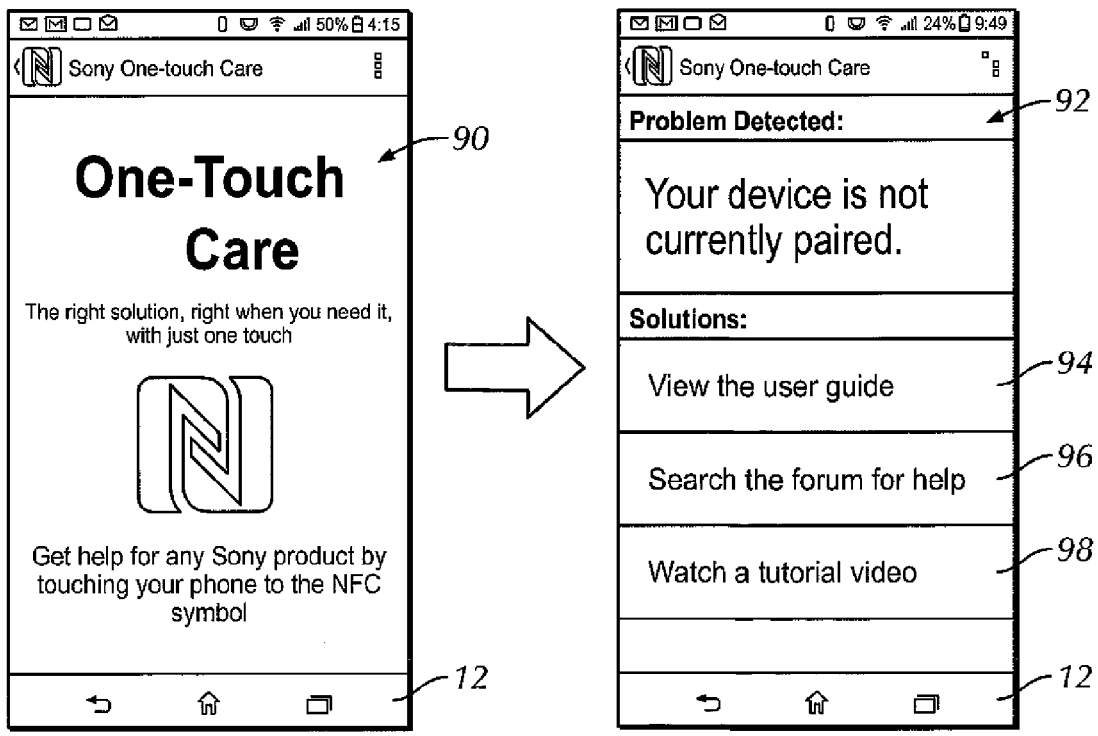
FIG. 5 shows two screen shots of example return messages.

As another example, as shown in FIG. 5 multiple solutions are provided for a product that is embodied as a SRS-BTV5 (a TV). When for example the SRS-BTV5 Bluetooth speaker is touched by the user computer, an issue that has been diagnosed by the TV and passed through NFC to the user computer, which reformatted the NFC payload to JSON and sent it to the server, results in a query response in which three solutions are provided from the server (in this case, links to two websites and one informative video). An example message would be:

```
{
"otc_version":"1.0",
"device"
{
    "model":"SRS-BTV5",
    "serial":"A2468"
}
"problem"
{
    "problem_id":"1",
    "desc":"Your device is not currently paired."
}
"solutions":[
    {
        "solution_id":"1",
        "desc":"View the user guide",
        "url":"http://www.sony.com/manual/srsbtv5"
    },
    {
        "solution_id":"2",
        "desc":"Search the forums for help",
        "url":"http://www.sony.com/forums?m=srsbtv5"
    },
    {
        "solution_id":"3",
        "desc":"Watch a tutorial video",
        "url":"http://www.youtube.com/watch?v=9876"
    },
]
}
```

As shown in FIG. 5, at 90 the user computer prompts the user to touch the user computer (embodied by a smart phone in this example) to an NFC symbol on the product. In response, at 92 the results of the user computer parsing the query response above from the server results in prompts 94, 96 to visit respective informational web sites and a prompt 98 to link to an informational video.

As yet another example, online access to purchase a TV may be afforded by propagating Wi-Fi settings as follows. A solution can be designed to transfer working Wi-Fi settings on the client device to another device which has not been setup for network access (such as a TV). An example message may be:

```
{
    "otc_version":"1.0",
    "device"
    {
        "model":"SRS-BTV5",
        "serial":"A2468"
    }
    "problem"
    {
        "problem_id":"1",
        "desc":"Your device is not currently paired."
    }
    "solutions":[
        {
            "solution_id":"1",
            "desc":"Learn how to setup your TV's internet connection",
            "url":"http://www.sony.com/manual/xbr900a#internet"
        },
        {
            "solution_id":"2",
            "desc":"Transfer internet settings from your phone",
            "cmd":"_$device.setup_wifi($client.wifi.settings)"
        },
    ]
}
```

FIG. 6 schematically shows a data structure 100 available to the cloud server executing the user computer queries in which problems in a left column 102 are correlated with solutions 104, including network addresses 106 associated with the solutions, keywords 108 associated with the solution, and payloads 110 to use in returning the solutions to the user computers.

Ancillary features that may be used include compression of the OTC record payloads uploaded to the server to minimize data transferred, and the removal of unnecessary items and formatting elements from payloads, e.g., by following a predefined field structure and size, and by using bitmaps rather than passing actual values. Also, all data passing between the product and user computer via NFC may be encrypted and HTTPS/SSL may be used for communication between the user computer and the server. Authentication may be employed to allow interfacing with a user computer device only if proper authentication is performed. Data obscurity may be afforded by not allowing outside parties to easily discover details about exposed data or interfaces. Language and regional support can be provided to provide the ability for regional teams to drive customers to regional support information in the correct language, and data can be retrieved language/region from the target device (product). Also, language/regional information from the user computer can be accessed for use, which allows for assigning different solutions based on regions in which the products are located. For example, products in Japan are supported by a call center in Japan, so the appropriate contact information should be displayed to all customers in that region.

With the above in mind, present principles increase customer satisfaction and decrease frustration by providing solutions targeted to the customer's "context" (personal products, conditions, behaviors, etc.) Solutions are provided throughout the full "product lifetime", not just for product failures or critical conditions, and existing investment in resources, people, practices are leveraged as solutions to provide help to customers more directly and efficiently. The need is reduced for customers to contact product manufacturers for help by providing opportunities for "self help", reducing manufacturer support cost. Lead time, call duration, etc. are reduced when the customer does need to contact the manufacturer for support. Review metrics and feedback can be generated from the above single touch operation to identify customer issues and review solution success rates.

While the particular ONE TOUCH PRODUCT INFORMATION ON MOBILE COMMUNICATION DEVICE USING NEAR FIELD COMMUNICATION is herein shown and described in detail, it is to be understood that the subject matter which is encompassed by the present invention is limited only by the claims.

What is claimed is:

1. A mobile communication device (MCD) comprising:
at least one computer memory that is not a transitory signal and that comprises instructions executable by at least one processor for:
establishing a wireless near field communication (NFC) link with an electronic product;
receiving at least identifying data of the product over the link;
sending the identifying data of the product to a network server; and
in response to sending the identifying data of the product to a network server, obtaining from a network server information about the product, wherein the information about the product is sent from the MCD to the product for display thereof on the product.

2. The MCD of claim 1, wherein the instructions are executable for:
invoking an information application responsive to a single user selection of a selector element to invoke the information application; and
automatically and without further user interaction execute the information application to undertake the establishing, receiving, sending, and obtaining acts.

3. The MCD of claim 1, wherein the receiving, sending, and obtaining acts are executed using wireless communication.

4. The MCD of claim 1, wherein at least one of the receiving, sending, and obtaining acts is executed using wireless communication.

5. The MCD of claim 1, wherein the MCD and the product both use a predetermined communication protocol to communicate over NFC, the predetermined protocol at least in part defining data fields in which the identifying data is contained.

6. The MCD of claim 1, wherein the identifying, data includes product serial number.

7. The MCD of claim 1, wherein the identifying data includes product model number.

8. The MCD of claim 7, wherein the identifying data includes product serial number.

9. The MCD of claim 1, wherein the identifying data includes firmware version of the product.

10. The MCD of claim 1, wherein the information about the product includes product registration continuation.

11. The MCD of claim 1, wherein the information about the product includes recall information related to the product.

12. The MCD of claim 1, wherein the information about the product includes operating instructions pertaining to the product and/or at least one user manual and/or at least one support form by which a user can request technical support for the product and/or an application sent from the server to the MCD and executed by the MCD to alter at least one configuration parameter of the MCD.

13. The MCD of claim 1, wherein the receiving at least identifying data of the product over the link is precipitated by a user of the MCD physically touching the MCD to the product as sensed by at least one sensor in the MCD and/or product.

14. The MCD of claim 1, wherein the instructions are executable for sending the identifying data of the product only to a server associated with a manufacturer of the product.

15. The MCD of claim 1, wherein the information about the product includes a network address and/or hyperlink selectable by a user to establish communication with a network site providing a user guide for the product.

16. The MCD of claim 1, comprising the at least one processor.

17. A mobile communication device (MCD) comprising:
at least one computer memory that is not a transitory signal and that comprises instructions executable by at least one processor for:

establishing a wireless near field communication (NFC) link with an electronic product;

receiving at least identifying data of the product over the link;

sending the identifying data of the product to a network server; and wherein in response to sending the identifying data of the product to a network server, the network server sends information about the product to the product without passing through the MCD.

18. The MCD of claim 1, wherein the information about the product includes an application sent from the server to the MCD and executed by the MCD to communicate with the product to cause the product to alter at least one configuration parameter of the product.

19. Method comprising:

establishing near field communication (NFC) between a mobile communication device (MCD) and an electronic product;

using NFC to receive identifying data of the product at the MCD;

wirelessly uploading the identifying data of the product to an Internet server; and receiving from an Internet server information about the product, wherein the information about the product is sent from MCD to the product for display thereof.

20. System comprising:

mobile communication device (MCD) including at least one computer memory that is not a transitory signal and that comprises instructions executable by at least one processor to:

establish near field communication (NFC) with an electronic product to be vended;

receive identifying data from the electronic product using NFC, and upload the data to a server associated with a manufacturer of the electronic product to receive back information about the product wherein in response to sending the identifying data of the product to the server, the server sends information about the product to the product.

* * * * *